(12) United States Patent
Lian

(10) Patent No.: US 9,408,272 B2
(45) Date of Patent: Aug. 2, 2016

(54) LIGHT DRIVER AND THE CONTROLLER AND DRIVING METHOD THEREOF

(71) Applicant: Chengdu Monolithic Power Systems Co., Ltd., Chengdu (CN)

(72) Inventor: Li Lian, Chengdu (CN)

(73) Assignee: Chengdu Monolithic Power Systems Co., Lt.d, Chengdu (CN)

( * ) Notice: Subject to any disclaimer, the term of this patent is extended or adjusted under 35 U.S.C. 154(b) by 0 days.

(21) Appl. No.: 14/749,443

(22) Filed: Jun. 24, 2015

(65) Prior Publication Data

US 2015/0373805 A1    Dec. 24, 2015

(30) Foreign Application Priority Data

Jun. 24, 2014 (CN) .......................... 2014 1 0287595

(51) Int. Cl.
*H05B 33/08* (2006.01)
*H05B 37/02* (2006.01)

(52) U.S. Cl.
CPC .......... *H05B 33/0851* (2013.01); *H05B 33/089* (2013.01); *H05B 33/0812* (2013.01); *H05B 37/02* (2013.01)

(58) Field of Classification Search
CPC .......... H05B 33/0851; H05B 33/0812; H05B 33/089; H05B 37/02

USPC .......................................................... 315/309
See application file for complete search history.

(56) References Cited

U.S. PATENT DOCUMENTS

| | | | | |
|---|---|---|---|---|
| 2011/0279057 A1* | 11/2011 | Briggs | ............... | H05B 37/0245 315/294 |
| 2014/0176111 A1* | 6/2014 | Kim | ........................ | G05F 1/613 323/311 |
| 2015/0351193 A1* | 12/2015 | Chao | .................. | H05B 33/0887 315/122 |
| 2016/0029455 A1* | 1/2016 | Aydin | ................ | H05B 33/0827 315/193 |

* cited by examiner

*Primary Examiner* — Dylan White
(74) *Attorney, Agent, or Firm* — Perkins Coie LLP (57) ABSTRACT

A light driver and the controller and the driving method thereof are disclosed. The controller has a reference generating circuit which has a dimming signal converting circuit, a thermal signal converting circuit and a selecting circuit. The dimming signal converting circuit converts a dimming signal into a converted dimming signal and the thermal signal converting circuit converts the thermal signal into a converted thermal signal. The selecting circuit selects the smaller one of the converted dimming signal and the converted thermal signal and outputs a reference signal based on the selected smaller signal.

20 Claims, 6 Drawing Sheets

LIGHT DRIVER AND THE CONTROLLER AND DRIVING METHOD THEREOF

CROSS-REFERENCE TO RELATED APPLICATIONS

This application claims the benefit of CN application No. 201410287595.3, filed on Jun. 24, 2014, and incorporated herein by reference.

TECHNICAL FIELD

The present invention relates generally to electronic circuits, and more particularly but not exclusively to methods for driving a lighting device and the light drivers and the controllers thereof.

BACKGROUND

In lighting field, there is a need to dim a lighting device as well as to monitor and to control the temperature thereof in order to prevent damage to the lighting device due to over temperature. A circuit is thus desired to accomplish the aforementioned and/or other functionalities.

SUMMARY

Embodiments of the present invention are directed to a controller for controlling a power converter to supply a driving current to a lighting device. The has a reference generating circuit and a control circuit. The reference generating circuit has a dimming signal converting circuit, a thermal signal converting circuit and a circuit. The dimming signal converting circuit receives a dimming signal and generates a converted dimming signal based on the dimming signal. The thermal signal converting circuit receives a thermal signal and generates a converted thermal signal based on the thermal signal. The selecting circuit receives the converted dimming signal and the converted thermal signal and generates a reference signal based on the smaller one of converted dimming signal and the converted thermal signal. The control circuit receives the reference signal and a feedback signal representative of the driving current and generates a control signal based on the reference signal and the feedback signal to the power converter.

Embodiments of the present invention are also directed to a light driver for driving a lighting device. The light driver has a power converter and a controller. The power converter supplies a driving current to the lighting device. The controller has a dimming signal converting circuit, a thermal signal converting circuit, a selecting circuit and a control circuit. The dimming signal converting circuit receives a dimming signal and generates a converted dimming signal based on the dimming signal. The thermal signal converting circuit receives a thermal signal and generates a converted thermal signal based on the thermal signal. The selecting circuit receives the converted dimming signal and the converted thermal signal and generates a reference signal based on the smaller one of the converted dimming signal and the converted thermal signal. The control circuit receives the reference signal and a feedback signal representative of the driving current and generates a control signal based on the reference signal and the feedback signal to control the power converter.

Embodiments of the present invention are further directed to a driving of providing a driving current to drive a light device. The driving method comprises: receiving a dimming signal and a thermal signal; converting the dimming signal and the thermal signal respectively into a converted dimming signal and a converted thermal signal; selecting the smaller one of the converted dimming signal and the converted thermal signal; generating a reference signal based on the selected smaller signal; receiving a feedback signal representative of the driving current; and generating a signal based on the reference signal and the feedback signal to regulate the driving current.

BRIEF DESCRIPTION OF THE DRAWINGS

The present invention can be further understood with reference to the following detailed description and the appended drawings, wherein like elements are provided with like reference numerals.

DESCRIPTION

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to taken in a limiting sense.

Throughout the specification, the meaning of "a," "an," and "the" may also include plural references.

Figure 1:
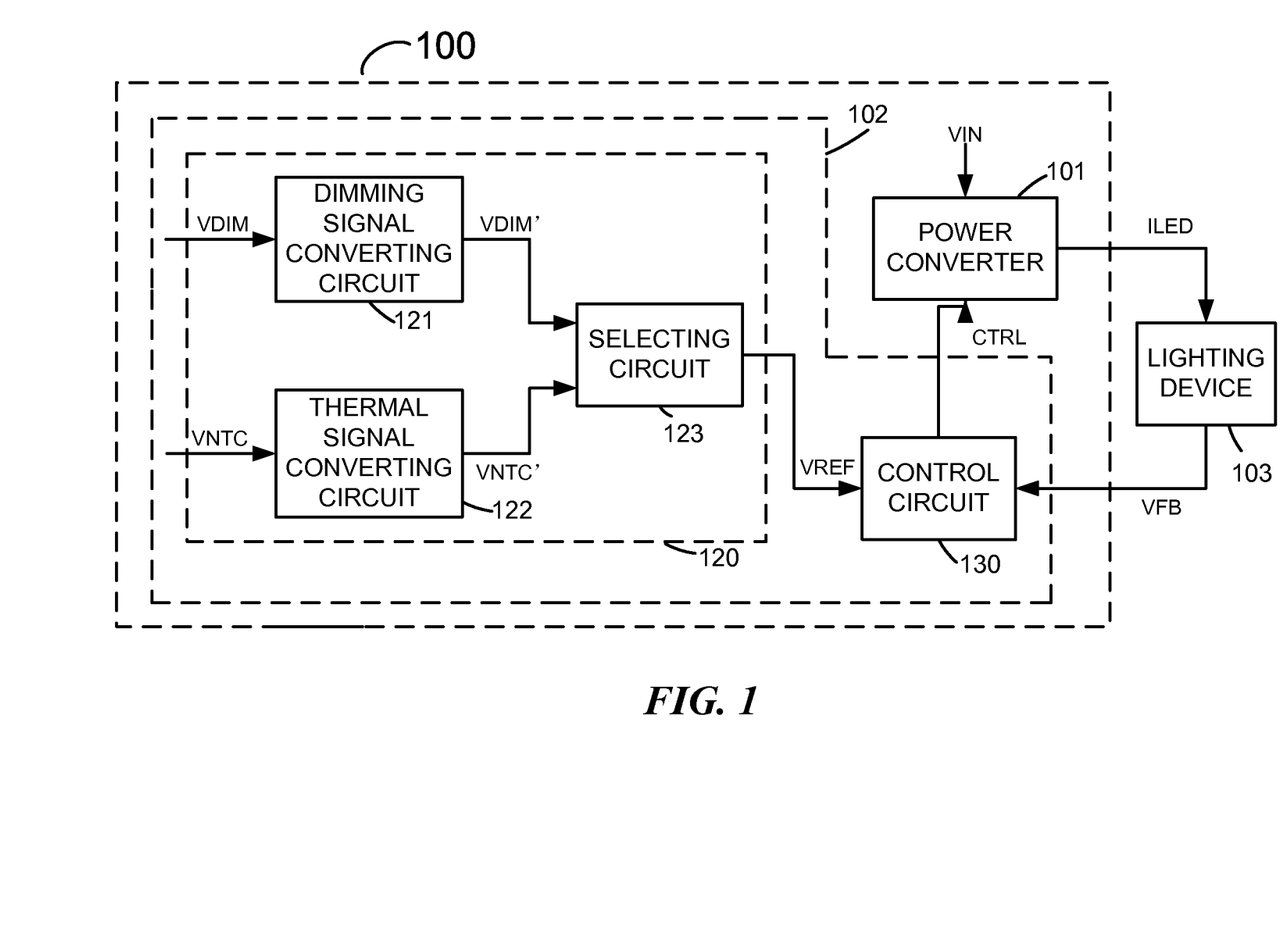
FIG. 1 illustrates a light driver 100 in accordance with an embodiment of the present invention.

FIG. 1 illustrates a light driver 100 in accordance with an embodiment of the present invention. As shown in FIG. 1, the light driver 100 comprises a power converter 101 and a controller 102, wherein the controller 102 comprises a reference generating circuit 120 and a control circuit 130.

The reference generating circuit 120 comprises a dimming signal converting circuit 121, a thermal signal converting circuit 122 and a selecting circuit 123. The dimming signal converting circuit 121 is configured to receive a dimming signal VDIM which regulates the intensity of a lighting device 103 and to further convert the dimming signal VDIM into a converted dimming signal VDIM'. In one embodiment, the converted dimming signal VDIM' is proportional to the dimming signal VDIM with a first proportional factor K1, i.e., VDIK=K1×VDIM. In another embodiment, the converted dimming signal VDIM' is equal to the dimming signal VDIM, i.e., VDIM'=VDIM. In such an embodiment, the dimming signal converting circuit 121 may be a circuit with a unity gain, for example, a conducting line. In still another embodiment, the dimming signal VDIM may be an external DC voltage.

The thermal signal converting circuit 122 is configured to receive a thermal signal VNTC which represents the temperature of the lighting device 103 and to further convert the thermal signal VNTC into a converted thermal signal VNTC'. In one embodiment, the converted thermal signal VNTC' is proportional to the thermal signal VNTC with a second proportional factor K2, i.e., VNTC'=K2×VNTC. In another embodiment, the converted thermal signal VNTC' is equal to the thermal signal VNTC, VNTC'=VNTC. In such an embodiment, the thermal signal converting circuit 122 may a circuit with a unity gain, for example, a conducting line. In still another embodiment, thermal signal VNTC may be provided by a circuit serially consisting of a current source and a thermistor with the resistance varying with the temperature of the lighting device. use, a current supplied by the current source flows through the thermistor and the voltage across the thermistor serves as the thermal signal VNTC.

In one embodiment, the converted dimming signal VDIM' and/or the converted thermal signal VNTC' may be a voltage signal, a current signal or any other appropriate signal type.

The selecting circuit 123 is electrically coupled to the diming signal circuit 121 and the thermal signal converting circuit 122 to respectively receive the converted dimming signal VDIM' and the converted thermal signal VNTC'. The selecting circuit 123 is configured to select the smaller one of the converted dimming signal VDIM' and the converted thermal signal VNTC' and to further provide a reference signal VREF based on the smaller signal. In one embodiment, the selecting circuit 123 outputs the selected smaller signal between the converted dimming signal VDIM' and the converted thermal signal VNTC' as the reference signal. Just by way of example, when the converted dimming signal VDIM' and the converted thermal signal VNTC' are both signals, the selecting circuit 123 chooses the signal with the smaller voltage value between the two as a reference voltage signal VREF. In another embodiment, the selecting circuit 123 is further configured to convert the selected smaller signal into a converted signal and to provide the converted signal as the reference signal VREF, wherein the reference signal VREF is proportional to the selected smaller signal. For example, when the converted dimming signal VDIM' and the converted thermal signal VNTC' are both current signals, the selecting circuit 123 selects the signal with the current value between the two and further converts the selected smaller current signal a voltage signal which serves as the reference voltage signal VREF.

In one embodiment where VDIM'=K1×VDIM and VNTC'=K2×VNTC, the first proportional factor K1 and the second proportional factor K2 is such related so that VDIM'_MAX=VNTC'_MAX, wherein VDIM'_MAX and VNTC'_MAX are respectively the maximum values of the converted dimming signal VDIM' and the converted thermal signal VNTC'. Further, the above equation can be expressed as K1×VDIM_M=K2×VNTC_M, wherein VDIM_M and VNTC_M are respectively the maximum rating values of the dimming signal VDIM and the thermal signal VNTC. Thus, the first proportional factor K1 and the second proportional factor K2 has a relationship expressed as K1/K2=VNTC_M/VDIM_M.

The power converter 101 is configured to receive an input voltage VIN and to further convert the input voltage VIN into a driving current ILED provided to drive the lighting device 103. In one embodiment, the power convert 101 may be implemented with any appropriate DC/DC or AC/DC converting topologies, such as a synchronous or asynchronous buck or boost, a forward converter or a fly-back converter etc. In another embodiment, the lighting device 103 may be a single light emitting diode (LED), a string of LEDs, or a parallel configuration of LED strings.

The control circuit 130 is configured to receive the reference signal VREF and a feedback signal VFB representative of the driving current ILED and to further generate a control signal CTRL based on the reference signal VREF and the feedback signal VFB to control the power converter 101. In one embodiment, the control circuit 130 may be implemented by pulse-width-modulation (PWM) or pulse-frequency-modulation (PFM). In another embodiment, the control circuit 130 may use current mode control, like peak-current mode control or average-current mode control, or voltage mode control and so on.

Figure 2A:
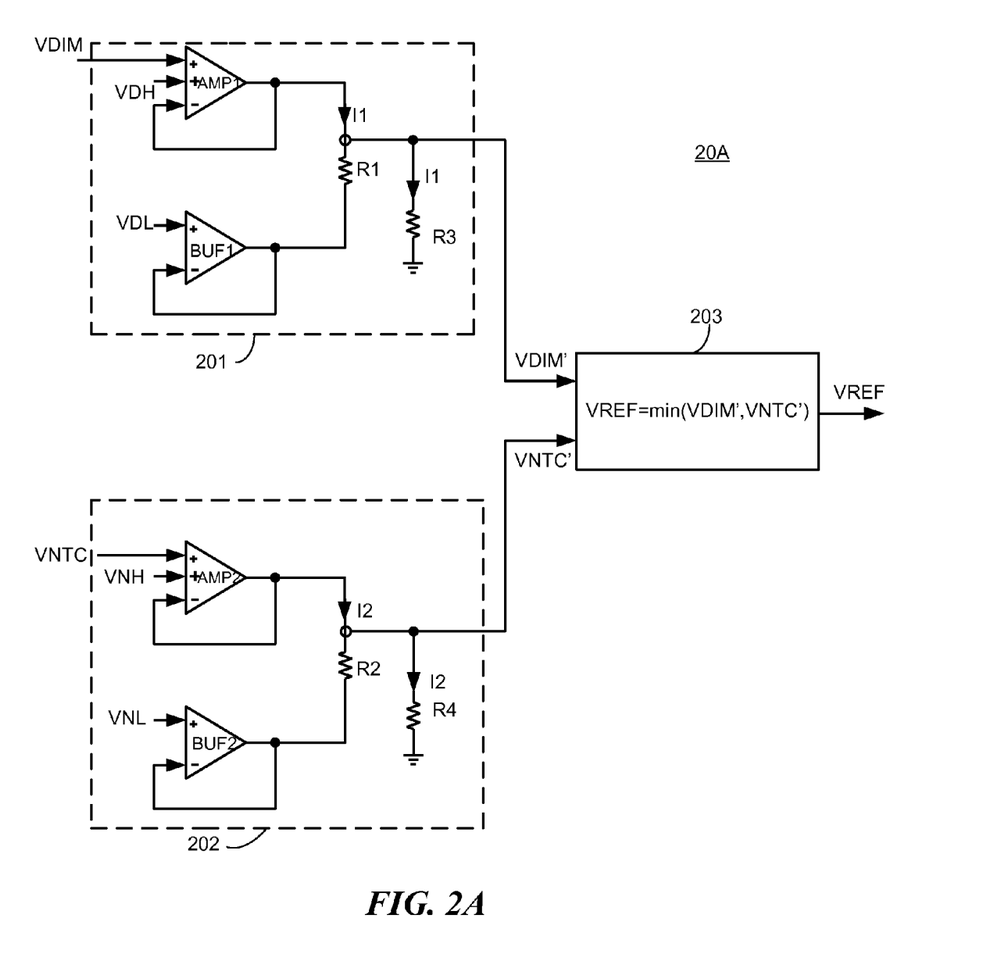
FIG. 2A illustrates a reference generating circuit 20A in accordance with an embodiment of the present invention.

FIG. 2A illustrates a reference generating circuit 20A in accordance with an embodiment of the present invention. As shown in FIG. 2A, the reference generating circuit 20A comprises a dimming signal converting circuit 201, a thermal signal converting circuit 202 and a selecting circuit 203. The dimming signal converting circuit 201 comprises an amplifier AMP1, a buffer BUF1, and resistors R1 and R3. The amplifier AMP1 has a first input terminal, a second input terminal, a third input terminal and an output terminal, wherein the first input terminal is configured to receive a dimming signal VDIM, the second input terminal is configured to receive a first dimming threshold VDH, and the third input terminal is electrically coupled to the output terminal. The resistor R1 has a first terminal and a second terminal, wherein the first terminal is electrically coupled to the output terminal of the amplifier AMP1. The buffer BUF1 has a first input terminal, a second input terminal and an output terminal, wherein the first input terminal is configured to receive a second dimming threshold VDL, and the output terminal is electrically coupled to the second input terminal of the buffer BUF1 and the second terminal of the resistor R1. The resistor R3 has a first terminal and a second terminal, wherein the first terminal is electrically coupled to the first terminal of the resistor R1 to receive a first current I1 flowing therethrough, and the second terminal is coupled to a reference ground. The first terminal of the resistor R3 serves as an output terminal of the dimming signal converting circuit 201 to provide the converted dimming signal VDIM' which is a resultant voltage across the resistor R3 when the first current I1 flows therethrough. In operation, when the dimming signal VDIM is lower than the second dimming threshold VDL, the first current I1 is zero. When the dimming signal VDIM is higher than the second dimming threshold VDL and lower than the first dimming threshold VDH, the first current I1 is (VDIM−VDL)/R1. When the dimming signal VDIM is higher than the first dimming threshold VDH, the first current I1 has a maximum value of (VDH−VDL)/R1.

The thermal signal converting circuit 202 comprises an amplifier AMP2, a buffer BUF2, and resistors R2 and R4. The amplifier AMP2 has a first input terminal, a second input terminal, a third input terminal and an output terminal, wherein the first terminal is configured to receive a thermal signal VNTC, the second input terminal is configured to receive a first thermal threshold VNH, and the third input terminal is electrically coupled to the output terminal. The resistor R2 has a first terminal and a second terminal, wherein the first terminal is electrically coupled to the output terminal of the amplifier AMP2. The buffer BUF2 has a first input terminal, a second input terminal and an output terminal, wherein the first input terminal is configured to receive a second thermal threshold VNL, and the output terminal is electrically coupled to the second input terminal thereof and the second terminal of the resistor R2. The resistor R4 has a first terminal and a second terminal, wherein the first terminal is electrically coupled the first terminal of the resistor R2 to receive a second current I2 flowing therethrough, and the second terminal is coupled to the reference ground. The first terminal of the resistor R4 serves as an output terminal of the thermal signal converting circuit 201 to provide the converted thermal signal VNTC' which is a resultant voltage across the resistor R4 when the second current I2 flows therethrough. In operation, when the thermal signal VNTC is lower than the second thermal threshold VNL, the second current I2 is zero. When the thermal signal VNTC is higher than the second thermal threshold VNL and lower than first thermal threshold VNH, the second current I2 is (VNTC−VNL)/R2. When the thermal signal VNTC is higher than the first thermal threshold VNH, the second current I2 has a maximum value of (VNH−VNL)/R2.

In one embodiment, the resistors R1-R4 are so set to ensure that the maximum value of the converted dimming signal VDIM' is equal to that of the converted thermal signal VNTC', i.e., $\frac{R_3 \times (VDH - VDL)}{R_1} = \frac{R_4 \times (VNH - VNL)}{R_2}$.

Thus, $$\frac{R_3 \times R_2}{R_4 \times R_1} = \frac{VNH - VNL}{VDH - VDL}.$$

In a further embodiment where the resistors R3 and R4 have the same value, there is $$\frac{R_2}{R_1} = \frac{VNH - VNL}{VDH - VDL}.$$

The selecting circuit 203 is electrically coupled to the dimming signal converting circuit 201 and the thermal signal converting circuit 202 to respectively receive the converted dimming signal VDIM' and the converted thermal signal VNTC'. The selecting circuit 203 selects the smaller one of the converted dimming signal VDIM' and the converted thermal signal VNTC' and further outputs the smaller one as a reference signal VREF.

Figure 2B:
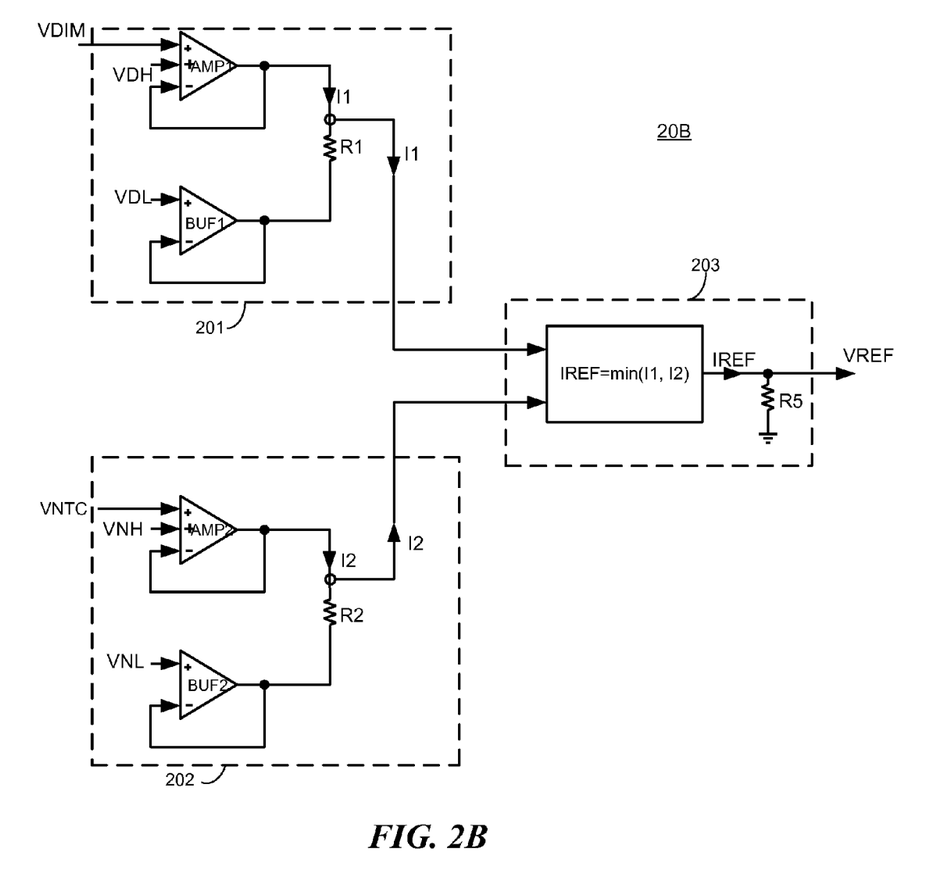
FIG. 2B illustrates a reference generating circuit 20B in accordance with another embodiment of the present invention.

FIG. 2B illustrates a reference generating circuit 20B in accordance with another embodiment of the present invention. Similar to the reference generating circuit 20A of FIG. 2A, in FIG. 2B, the dimming signal converting circuit 201 comprises an amplifier AMP1, a buffer BUF1 and a resistor R1, and the thermal signal converting circuit 202 comprises an amplifier AMP2, a buffer BUF2 and a resistor R2, and further, the above-mentioned components have the same interconnecting configuration and operation manner which will not be described herein for clarity purpose. Compared with FIG. 2A, the resistors R3 and R4 are respectively omitted from the dimming signal converting circuit 201 and the thermal signal converting circuit 202 in FIG. 2B, and in addition, the selecting circuit 203 of FIG. 2B comprises a resistor R5. The selecting circuit 203 of FIG. 2B is electrically coupled the dimming signal converting circuit 201 and the thermal signal converting circuit 202 to respectively receive the currents I1 and I2. The selecting circuit 203 selects the smaller one of the currents I1 and I2 as a reference current signal IREF and provides the voltage across the resistor R5 when the reference current signal IREF flows through as the reference signal VREF.

Figure 3:
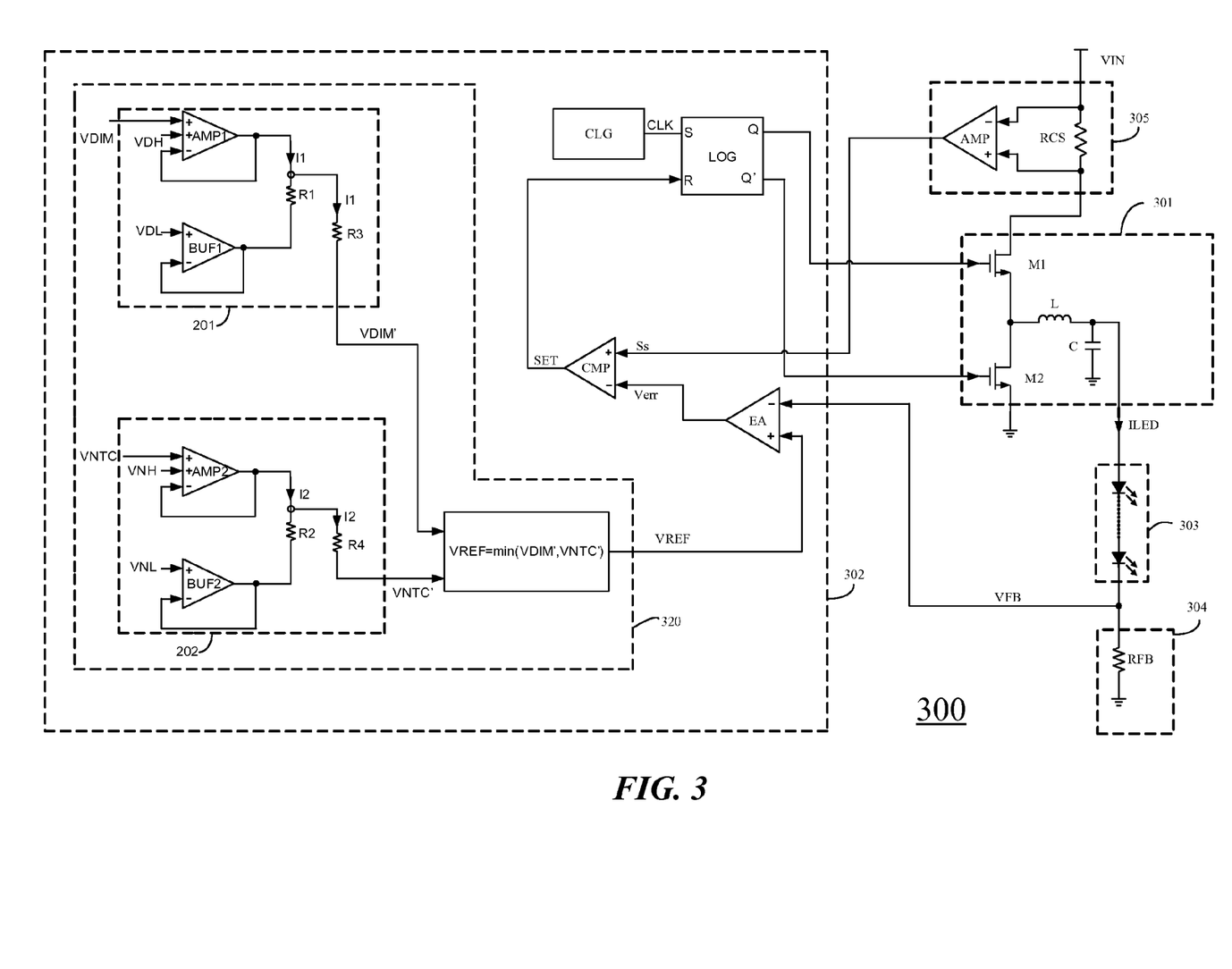
FIG. 3 illustrates a light driver 300 for driving a lighting device 303 in accordance with an embodiment of the present invention.

FIG. 3 illustrates a light driver 300 for driving a lighting device 303 in accordance with an embodiment of the present invention. As shown in FIG. 3, the lighting device 303 comprises an LED string having a first terminal and a second terminal. The light driver 300 comprises a power converter 301, a controller 302, a feedback circuit 304 and a current detecting circuit 305.

The power converter 301 is implemented with a synchronous buck topology and comprises a high-side switch M1, a low-side switch M2, an inductor L and a capacitor C. The power converter 301 converts an input voltage VIN into a driving current ILED by controlling the switching actions of the high-side switch M1 and the low-side switch M2. The high-side switch M1 has a first terminal, a second terminal and a control terminal, wherein the first terminal is configured to receive the input voltage VIN. The low-side switch M2 has a first terminal, a second terminal and a control terminal, wherein the first terminal is electrically coupled to the second terminal of the high-side switch M1, and the second terminal is electrically coupled to a reference ground. The inductor L has a first terminal and a second terminal, wherein the first terminal is electrically coupled to the common node of the high-side switch M1 and the low-side switch M2. The capacitor C is electrically coupled between the second terminal of the inductor L and the reference ground. The common node of the inductor L and the capacitor C serves as an output terminal of the power converter 301 and is electrically coupled to the first terminal of the lighting device 303 to provide the driving current ILED.

In one embodiment, the high-side switch M1 and/or the low-side switch M2 may be accomplished with any controllable semiconductor switching device, such as a Metal-Oxide-Semiconductor filed effect transistor (MOSFET), an insulated gate bipolar transistor (IGBT) etc. In another embodiment, the low-side switch M2 may be alternatively replaced by any other type of freewheeling device, like a diode.

The feedback circuit 304 comprises a resistor RFB having a first terminal and a second terminal. The first terminal is electrically coupled the second terminal of the lighting device 303 to provide a feedback signal VFB, and the second terminal is electrically coupled to the reference ground.

The current detecting circuit 305 comprises a resistor RCS and an amplifier AMP. The resistor RCS has a first terminal and a second terminal, wherein the first terminal is configured to receive the input voltage VIN, and the second terminal is electrically coupled the first terminal of the high-side switch M1. The amplifier AMP has a first input terminal, a second input terminal and an output terminal, wherein the first input terminal is electrically coupled to the first terminal of the resistor RCS, and the second terminal is electrically coupled to the second terminal of the resistor RCS. The amplifier AMP amplifies the voltage across the resistor RCS and provides a current detecting signal Ss at the output terminal. Persons of ordinary skill in the art will recognize that, in another embodiment, the resistor RCS may be a resistor existing in the conducting loop where the inductor current increases or decreases, for example, a sample resistor serially coupled with the inductor L and the switch M1/M2, an on-resistor of the high-side switch M1 or the low-side switch M2. In still another embodiment, the current detecting circuit 305 may be integrated with the controller 302. It should be noted that the current detecting circuit 305 is shown to be separate from the controller 302, however, other embodiments are contemplated where the current detecting circuit is a component of the controller.

The controller employs peak-current mode control and comprises a reference generating circuit 320, an error amplifier EA, a comparator CMP, a clock signal generating circuit CLG and a logic circuit LOG. The reference generating circuit 320 has similar configuration as that of the reference generating circuit 20A of FIG. 2A and will not be described herein for clarity purpose. The error amplifier EA has a first input a second input terminal and an output terminal, wherein the first input terminal is electrically coupled to the feedback circuit 304 to receive the feedback signal VFB, the second input terminal is electrically coupled to the reference generating circuit 320 to receive the reference signal VREF. The error amplifier EA amplifies the difference between the reference signal VREF and the feedback signal VFB and outputs an error signal Verr at the output terminal. The comparator CMP has a first input terminal, a second input terminal and an output terminal, wherein the first input terminal is coupled to the current detecting circuit 305 to receive the current detecting signal Ss, the second input terminal is electrically coupled to the output terminal of the error EA to receive the error signal Verr. The comparator CMP compares the current signal Ss with the error signal Verr and outputs a comparison signal SET at the output terminal. The clock signal generating circuit CLG is configured to generate a clock signal CLK. The logic circuit LOG has a first input terminal, a second input terminal, a first terminal and a second output terminal, wherein the first input terminal is electrically coupled to the clock signal generating circuit CLG to receive the clock signal CLK, the second input terminal is electrically coupled to the output terminal of the comparator to receive the comparison signal SET. Based on the clock signal CLK and the signal SET, the logic circuit LOG is configured to generate a control signal Q at the first output terminal and a control signal Q' at the second output terminal which are provided to the control terminals of the high-side switch M1 and the low-side switch M2.

In use, the logic circuit LOG is set at a rising edge of the clock signal CLK thus outputs the control signal Q to turn on the high-side switch M1 as well as the control signal Q' to turn off the low-side switch M2. The inductor current flowing through the inductor L thus increases gradually, and so does the current flowing through the resistor RCS. As a result, the current detecting signal Ss provided by the amplifier AMP with the inductor current. When the current detecting signal Ss is higher than the error signal Verr, the comparator CMP outputs a comparison signal SET to reset the logic LOG which in turn outputs the control signal Q to turn off the high-side switch M1 as well the control signal Q' to turn on the low-side switch M2. Accordingly, the inductor L, the capacitor C and the low-side switch M2 forms a conducting path and the inductor current decreases. At the next rising edge of the clock signal CLK, the high-side switch M1 is turned on and the low-side switch M2 is turned off again, and a new cycle begins.

Figure 4A:
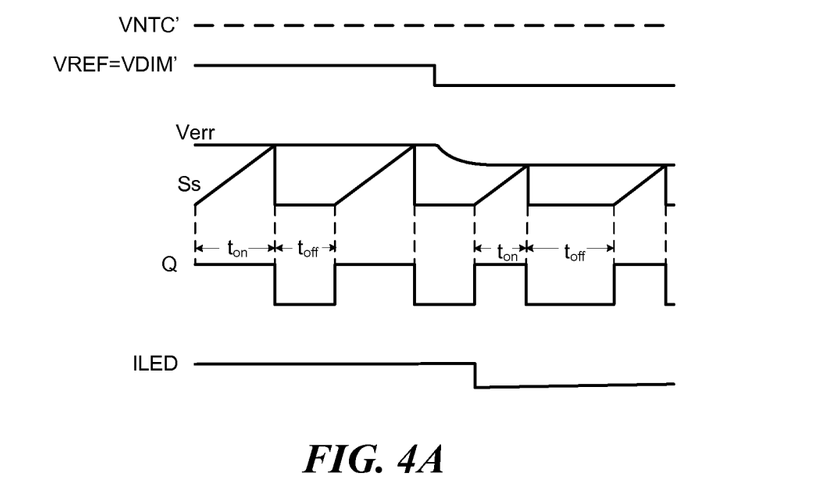
FIGS. 4A-4C illustrates the signal waveforms of the reference generating circuit 320 under the initial condition that the converted dimming signal VDIM' is lower than the converted thermal signal VNTC'(VDIM'<VNTC'), that is, VREF=VDIM'.
Figure 4B:
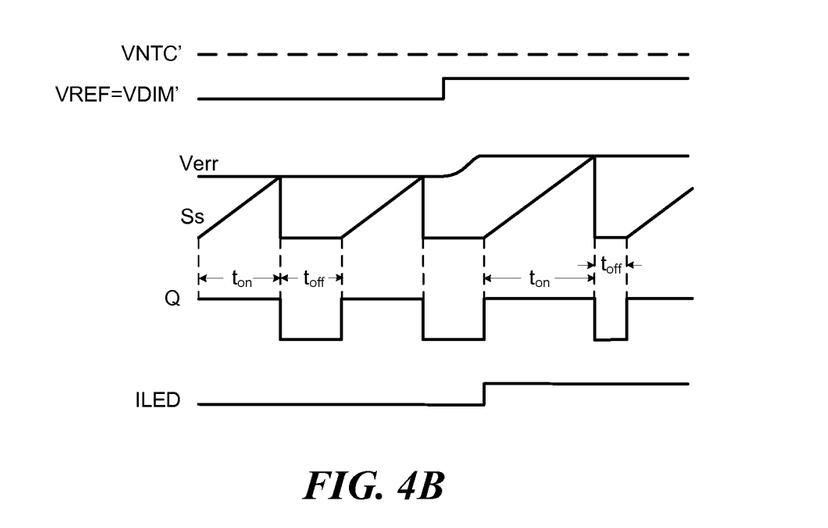
Figure 4C:
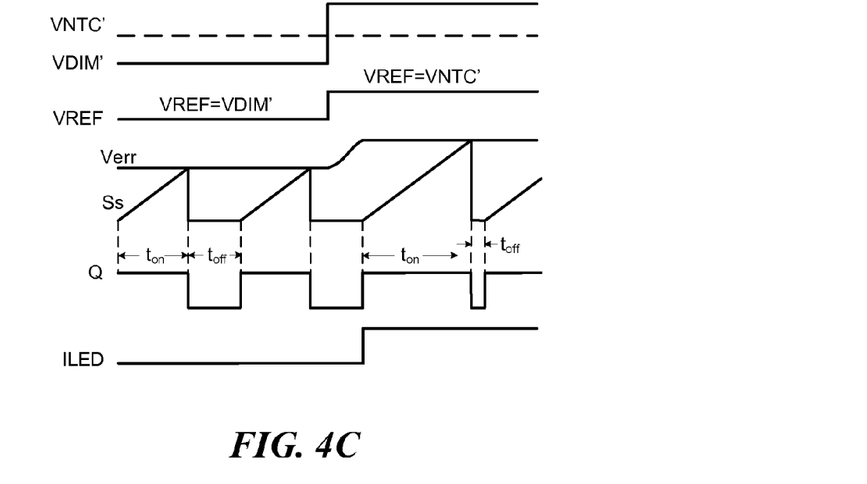

FIGS. 4A-4C illustrates the signal waveforms of the reference generating circuit 320 under the initial condition that the converted dimming signal VDIM' is lower than the converted thermal signal VNTC'(VDIM'<VNTC'), that is, VREF=VDIM'. In particular, FIG. 4A illustrates the signal waveforms of the reference generating circuit 320 when the dimming signal VDIM decreases. As shown in FIG. 4A, when the dimming signal VDIM decreases, the reference signal VREF is still equal to the converted dimming signal VDIM' and thus decreases with the dimming signal VDIM correspondingly, thus making the error signal Verr decrease accordingly. As a result, the on time ton of the high-side switch M1 decreases and the off time toff thereof increases, resulting in a reduced driving current ILED as well as a reduced intensity of the driving device 303.

FIG. 4B illustrates the signal waveforms of the reference generating circuit 320 when the dimming signal VDIM increases but the converted dimming signal VDIM' is still lower than the converted thermal signal VNTC' (VDIM'<VNTC'). As shown in FIG. 4B, under such condition, the reference signal VREF is still equal to the converted dimming signal VDIM' (VREF=VDIM') and thus increases with the dimming signal VDIM correspondingly, thus making the error signal Verr increase accordingly. As a result, the on time ton of the high-side switch M1 increases and the off time toff thereof decreases, resulting an increased driving current ILED as well as an increased intensity of the driving device 303.

FIG. 4C illustrates the signal waveforms of the reference generating circuit 320 when the dimming signal increases to an extent that the converted dimming signal VDIM' is larger than the converted thermal signal VNTC'(VDIM'>VNTC'). As shown in FIG. 4C, the reference signal VREF is equal to the converted thermal signal VNTC' (VREF=VNTC') under this condition. Thus, the error signal Verr increases but is determined by the converted thermal signal VNTC'. Thus, the on time ton of the high-switch M1 increases and the off time toff thereof decreases. The values of the on time and the off time toff are determined by the thermal signal VNTC. As a result, the driving current ILED increases, enhancing the brightness of the lighting device 303. And in addition, the driving current ILED is determined by the thermal signal VNTC and stops increasing at a point even the dimming signal VDIM still increases, thus preventing the lighting device 303 from over temperature.

It should be noted that a similar operation can be performed under the initial condition that the converted dimming signal VDIM' is higher than the converted thermal signal VNTC' (VDIM'>VNTC'), that is, VREF=VNTC'. The detailed description will not be presented herein for clarity purpose.

Figure 5:
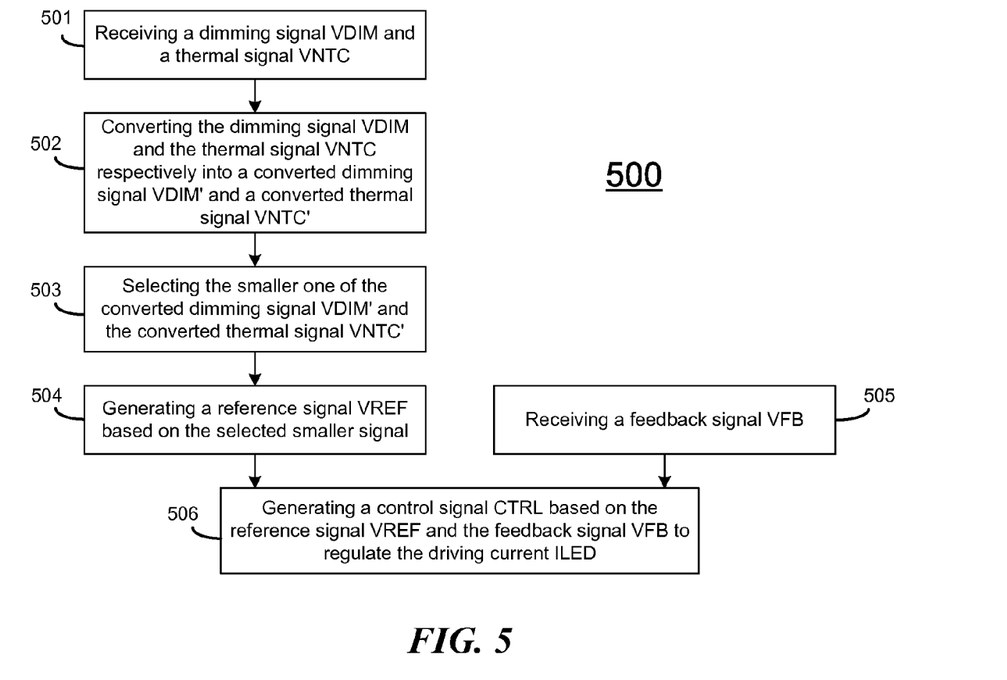
FIG. 5 illustrates a driving method 500 for driving a lighting device in accordance with an embodiment of the present invention.

FIG. 5 illustrates a driving method 500 for driving a lighting device in accordance with an embodiment of the present invention. As shown in FIG. 5, the driving method 500 comprises steps 501-506. In step 501, a dimming signal VDIM and a thermal signal VNTC are provided. Next in step 502, the dimming signal VDIM is converted into a converted dimming signal VDIM' while the thermal signal VNTC is converted into a converted thermal signal VNTC'. Then in step 503, the smaller one of the converted dimming signal VDIM' and the converted thermal signal VNTC' is selected so that a reference signal VREF is generated based on the selected smaller signal in the following step 504. In step 505, a feedback signal VFB representative of a driving current ILED served to drive the lighting device is obtained. Next in step 506, a control signal CTRL is generated based on the reference signal VREF and the feedback signal VFB to regulate the driving current ILED.

In one embodiment, the converted dimming signal and the converted thermal signal may be voltage signal, current signal or any other appropriate signal type.

In another embodiment, in step 502, the converted dimming signal VDIM' is proportional to the dimming signal VDIM, and/or the converted thermal signal VNTC' is proportional to the thermal signal VNTC. In still another embodiment, the converted diming signal VDIM' is equal to the dimming signal VDIM, and/or the converted thermal signal VNTC' is equal to the thermal signal VNTC.

In still another embodiment, the step 503 of generating the reference signal VREF based on the selected smaller signal may comprise selecting the smaller signal as the reference signal, or converting the smaller signal into a converted signal and outputting the converted signal as the reference signal, wherein the reference signal is proportional to the smaller signal.

In still another embodiment, the converted dimming signal VDIM' and the converted thermal signal VNTC' obtained in step 502 should be such related that the maximum values thereof are equal.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

What is claimed is:

1. A controller for controlling a power converter to supply a driving current to a lighting device, the controller comprises:
   a reference generating circuit comprising:
      a dimming signal converting circuit configured to receive a dimming signal and to generate a converted dimming signal based on the dimming signal;
      a thermal signal converting circuit configured to receive a thermal signal and to generate a converted thermal signal based on the thermal signal; and
      a selecting circuit configured to receive the converted dimming signal and the converted thermal signal and configured to generate a reference signal based on the smaller one of the converted dimming signal and the converted thermal signal; and
   a control circuit configured to receive the reference signal and a feedback signal representative of the driving current and to generate a control signal based on the reference signal and the feedback signal to control the power converter.

2. The controller of claim 1, wherein the maximum value of the converted dimming signal is equal to the maximum value of the converted thermal signal.

3. The controller of claim 1, wherein the converted dimming signal is proportional to the dimming signal and the converted thermal signal is proportional to the thermal signal.

4. The controller of claim 1, wherein the thermal signal converting circuit is omitted from the reference generating circuit and the thermal signal serves as the converted thermal signal.

5. The controller of claim 1, wherein the dimming signal converting circuit is omitted from the reference generating circuit and the dimming signal serves as the converted dimming signal.

6. The controller of claim 1, wherein the selecting circuit is configured to select and to output the smaller one of the converted dimming signal and the converted thermal signal as the reference signal.

7. The controller of claim 1, wherein the selecting circuit is configured to select the smaller one of the converted dimming signal and the converted thermal signal and to generate the reference signal based on the selected smaller signal, wherein the reference signal is proportional to the selected smaller signal.

8. The controller of claim 1, wherein
   the dimming signal converting circuit comprises:
      a first amplifier having a first input terminal, a second input terminal, a third input terminal and an output terminal, wherein the first input terminal is configured to receive the dimming signal, the second input terminal is configured to receive a first dimming threshold, and the third input terminal is electrically coupled to the output terminal of the first amplifier;
      a first resistor having a first terminal and a second terminal, wherein the first terminal is electrically coupled to the output terminal of the first amplifier; and
      a first buffer having a first input terminal, a second input terminal and an output terminal, wherein the first input terminal is configured to receive a second dimming threshold, the second input terminal is electrically coupled the output terminal of the first buffer and the second terminal of the first resistor, and wherein the second dimming threshold is lower than the first dimming threshold;
   wherein the thermal signal converting circuit comprises:
      a second amplifier having a first input terminal, a second input terminal, a third input terminal and an output terminal, wherein the first input terminal is configured to receive the thermal signal, the second input terminal is configured to receive a first thermal threshold, and the third input terminal is electrically coupled to the output terminal of the second amplifier;
      a second resistor having a first terminal and a second terminal, wherein the first terminal is electrically coupled to the output terminal of the second amplifier; and
      a second buffer having a first input terminal, a second input terminal and an output terminal, wherein the first input terminal is configured to receive a second thermal threshold, the second input terminal is electrically coupled the output terminal of the second buffer and the second terminal of the second resistor, and wherein the second thermal threshold is lower than the first thermal threshold; and wherein
   the selecting circuit comprises a selecting resistor, wherein the selecting circuit is configured to receive a first current flowing through the first resistor and a second current flowing through the second resistor and to select the one of the first current and the second current, and wherein the selecting circuit is configured to provide the voltage drop across the selecting resistor when the smaller current flows therethrough as the reference voltage.

9. The controller of claim 8, wherein
   when the dimming signal is lower than the second dimming threshold, the first current is zero; when the dimming signal is higher than the second dimming threshold and lower than the first dimming threshold, the first current is equal to the quotient of the difference between the dimming signal and the second dimming threshold divided by the resistance of the first resistor; when the dimming signal is higher than the first dimming threshold, the first current is equal to the quotient of the difference between the first dimming threshold and the second dimming threshold divided by the resistance of the first resistor; and when the thermal signal is lower than the second thermal threshold, the second current is zero; when the thermal signal is higher than the second thermal threshold and lower than the first thermal threshold, the second current is equal to the quotient of the difference between the thermal signal and the second thermal threshold divided by the resistance of the second resistor;

when the thermal signal is higher than the first thermal threshold, the second current is equal to the quotient of the difference between the first thermal threshold and the second thermal threshold divided by the resistance of the second resistor.

10. The controller of claim 1, wherein
the dimming signal converting circuit comprises:
  a first amplifier having a first input terminal, a second input terminal, third input terminal and an output terminal, wherein the first input terminal is configured to receive the dimming signal, the second input terminal is configured to receive a first dimming threshold, and the third input terminal is electrically coupled to the output terminal of the first amplifier;
  a first resistor having a first terminal and a second terminal, wherein the first terminal is electrically coupled to the output terminal of the first amplifier;
  a first buffer having a first input terminal, a second input terminal and an output terminal, wherein the first input terminal is configured to receive a second dimming threshold, the second input terminal is electrically coupled the output terminal of the first buffer and the second terminal of the first resistor, and wherein the second dimming threshold is lower than the first dimming threshold; and
  a third resistor having a first terminal and a second terminal, wherein the first terminal is electrically coupled to the first terminal of the first resistor to receive a first current flowing therethrough and the second terminal is electrically coupled to a reference ground, and wherein the voltage drop across the third resistor serves as the converted dimming signal; and wherein the thermal signal converting circuit comprises:
  a second amplifier having a first input terminal, a second input terminal, a third input terminal and an output terminal, wherein the first input terminal is configured to receive the thermal signal, the second input terminal is configured to receive a first thermal threshold, and the third input terminal is electrically coupled to the output terminal of the second amplifier;
  a second resistor having a first terminal and a second terminal, wherein the first terminal is electrically coupled to the output terminal of the second amplifier;
  a second buffer having a first input terminal, a second input terminal and an output terminal, wherein the first input terminal is configured to receive a second thermal threshold, the second input terminal is electrically coupled the output terminal of the second buffer and the second terminal of the second resistor, and wherein the second thermal threshold is lower than the first thermal threshold; and
  a forth resistor having a first terminal and a second terminal, wherein the first terminal is electrically coupled to the first terminal of the second resistor to receive a second current flowing through the second resistor and the second terminal is electrically coupled to the reference ground, and wherein the voltage drop across the forth resistor serves as the converted thermal signal; and wherein the selecting circuit is electrically coupled to the first terminals of the third resistor and the forth resistor to respectively receive the converted dimming signal and the converted thermal signal, and the selecting circuit is configured to select and to output the smaller one of the converted dimming signal and the converted thermal signal as the reference signal.

11. A light driver for driving a lighting device, comprising:
a power converter supplying a driving current to the lighting device; and
a controller comprising:
  a dimming signal converting circuit configured to receive a dimming signal and to generate a converted dimming signal based on the dimming signal;
  a thermal signal converting circuit configured to receive a thermal signal and to generate a converted thermal signal based on the thermal signal;
  a selecting circuit configured to receive the converted dimming signal and the converted thermal signal and to generate a reference signal based on the smaller one of the converted dimming signal and the converted thermal signal; and
  a control circuit configured to receive the reference signal and a feedback signal representative of the driving current and to generate a control signal based on the reference signal and the feedback signal to control the power converter.

12. The light driver of claim 11, wherein the maximum value of the converted dimming signal is equal to the maximum value of the converted thermal signal.

13. The light driver of claim 11, wherein the converted dimming signal is proportional to the dimming signal and the converted thermal signal is proportional to the thermal signal.

14. The light driver of claim 11, wherein the selecting circuit is configured to select and to output the smaller one of the converted dimming signal and the converted thermal signal as the reference signal.

15. The light driver of claim 11, wherein the selecting circuit is configured to the smaller one of the converted dimming signal and the converted thermal signal to generate the reference signal based on the selected smaller signal, and wherein reference signal is proportional to the selected smaller signal.

16. The light driver of claim 11, wherein
the dimming signal converting circuit comprises:
  a first amplifier having a first input terminal, a second input terminal, a third input terminal and an output terminal, wherein the first input terminal is configured to receive the dimming signal, the second input terminal is configured to receive a first dimming threshold, and the third input terminal is electrically coupled to the output terminal of the first amplifier;
  a first resistor having a first terminal and a second terminal, wherein the first terminal is electrically coupled to the output terminal of the first amplifier; and
  a first buffer having a first input terminal, a second input terminal and an output terminal, wherein the first input terminal is configured to receive a second dimming threshold, the second input terminal is electrically coupled the output terminal of the first buffer and the second terminal of the first resistor, and wherein the second dimming threshold is lower than the first dimming threshold; and wherein the thermal signal converting circuit comprises:
  a second amplifier having a first input terminal, a second input a third input terminal and an output terminal, wherein the first input terminal is configured to receive the thermal signal, the second input terminal is configured to receive a first thermal threshold, and the third input terminal is electrically coupled to the output terminal of the second amplifier;

a second resistor having a first terminal and a second terminal, wherein the first terminal is electrically coupled to the output terminal of the second amplifier; and a second buffer having a first input terminal, a second input terminal and an output terminal, wherein the first input terminal is configured to receive a second thermal threshold, the second input terminal is electrically coupled the output terminal of the second buffer and the second terminal of the second resistor, and wherein the second thermal threshold is lower than the first thermal threshold; and wherein the selecting circuit comprises a selecting resistor, wherein the selecting circuit is configured to receive a first current flowing through the first resistor and a second current flowing through the second resistor and to select the smaller one of the first current and the second current, and wherein the selecting circuit is configured to provide the voltage drop across the selecting resistor when the smaller current flows therethrough as the reference voltage.

17. The light driver of claim 11, wherein the dimming signal converting circuit comprises:

a first amplifier having a first input terminal, a second input terminal, a third input terminal and an output terminal, wherein the first input terminal is configured to receive the dimming signal, the second input terminal is configured to receive a first dimming threshold, and the third input terminal is electrically coupled to the output terminal of the first amplifier;

a first resistor having a first terminal and a second terminal, wherein the first terminal is electrically coupled to the output terminal of the first amplifier;

a first buffer having a first input terminal, a second input terminal and an output terminal, wherein the first input terminal is configured to receive a second dimming threshold, the second input terminal is electrically coupled the output terminal of the first buffer and the second terminal of the first resistor, and wherein the second dimming threshold is lower than the first dimming threshold; and a third resistor having a first terminal and a second terminal, wherein the first terminal is electrically coupled to the first terminal of the first resistor to receive a first current flowing therethrough and the second terminal is electrically coupled to a reference ground, and wherein the voltage drop across the third resistor is provided as the converted dimming signal; and wherein the thermal signal converting circuit comprises:

a second amplifier having a first input terminal, a second input terminal, a third input terminal and an output terminal, wherein the first input terminal is configured to receive the thermal signal, the second input terminal is configured to receive a first thermal threshold, and the third input terminal is electrically coupled to the output terminal of the second amplifier;

a second resistor having a first terminal and a second terminal, wherein the first terminal is electrically coupled to the output terminal of the second amplifier;

a second buffer having a first input terminal, a second input terminal and an output terminal, wherein the first input terminal is configured to receive a second thermal threshold, the second input terminal is electrically coupled the output terminal of the second buffer and the second terminal of the second resistor, and wherein the second thermal threshold is lower than the thermal threshold; and a forth resistor having a first terminal and a second terminal, wherein the first terminal is electrically coupled to the first terminal of the second resistor to receive a second current flowing through the second resistor and the second terminal is electrically coupled to the reference ground, and wherein the voltage drop across the forth resistor is provided as the converted thermal signal; and wherein the selecting circuit is electrically coupled to the first terminals of the third resistor and the forth resistor to respectively receive the converted dimming signal and the converted thermal signal, and the selecting circuit is configured to select and to output the smaller one of the converted dimming signal and the converted thermal signal as the reference signal.

18. A driving method of providing a driving current to drive a light device, comprising:

receiving a dimming signal and a thermal signal;

converting the dimming signal and the thermal signal respectively into a converted dimming signal and a converted thermal signal;

selecting the smaller one of the converted dimming signal and the converted thermal signal;

generating a reference signal based on the selected smaller signal;

receiving a feedback signal representative of the driving current; and generating a control signal based on the reference signal and the feedback signal to regulate the driving current.

19. The driving method of claim 18, wherein the maximum value of the converted dimming signal is equal to the maximum value of the converted thermal signal.

20. The driving method of claim 18, wherein the converted dimming signal is proportional to the dimming signal, the converted thermal signal is proportional to the thermal signal, and the reference signal is proportional to the selected smaller signal.

* * * * *